(12) United States Patent
Gerber et al.

(10) Patent No.: US 8,578,447 B2
(45) Date of Patent: Nov. 5, 2013

(54) METHOD AND APPARATUS FOR CONTENT AWARE OPTIMIZED TUNNELING IN A MOBILITY ENVIRONMENT

(75) Inventors: Alexandre Gerber, Madison, NJ (US);
Oliver Spatscheck, Randolph, NJ (US);
Jacobus Van Der Merwe, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 372 days.

(21) Appl. No.: 12/950,840

(22) Filed: Nov. 19, 2010

(65) Prior Publication Data
US 2012/0131664 A1      May 24, 2012

(51) Int. Cl.
*G06F 21/00*        (2013.01)
(52) U.S. Cl.
USPC ................................................. 726/2; 726/11
(58) Field of Classification Search
USPC ....................................................... 726/2, 11
See application file for complete search history.

(56) References Cited

U.S. PATENT DOCUMENTS

| | | | |
|---|---|---|---|
| 2007/0195801 A1* | 8/2007 | Hellgren et al. | 370/401 |
| 2008/0098476 A1* | 4/2008 | Syversen | 726/23 |
| 2008/0165740 A1* | 7/2008 | Bachmann et al. | 370/332 |
| 2010/0043047 A1* | 2/2010 | Archer et al. | 726/1 |
| 2010/0103874 A1* | 4/2010 | Vikberg | 370/328 |

FOREIGN PATENT DOCUMENTS

WO         WO 9949598 A1  *  9/1999

* cited by examiner

*Primary Examiner* — Lisa Lewis

(57) ABSTRACT

A method, computer readable medium and apparatus for performing content aware optimized tunneling in a communication network are disclosed. For example, the method authenticates a user endpoint device, establishes a tunnel to the user endpoint device if the user endpoint device is authenticated, analyzes content of a data packet transmitted through the tunnel to determine if the tunnel should be re-directed, and re-directs the tunnel to a gateway general packet radio services support node light based upon the content of the data packet.

19 Claims, 4 Drawing Sheets

METHOD AND APPARATUS FOR CONTENT AWARE OPTIMIZED TUNNELING IN A MOBILITY ENVIRONMENT

BACKGROUND

Current wireless technologies require a wireless data packet to go through a certain number of network elements on the wireless network via general packet radio services (GPRS) tunneling protocol (GTP) tunnels before reaching the Internet. Generally, all of the wireless communications have to go through a GPRS support node (GGSN) that can sometimes be located more than 1000 miles away from a device sending the data packet. The cost and complexity of GGSNs limit the number of GGSNs that are deployed across the country. As a result, sometimes the wireless communications experienced by a user may be unsatisfactory due to the fact that the wireless communications have to go through a GGSN that may be far away from the user's device.

SUMMARY

In one embodiment, the present disclosure teaches a method, computer readable medium and apparatus for performing content aware optimized tunneling in a communication network. In one embodiment, the method comprises authenticating a user endpoint device, establishing a tunnel to the user endpoint device if the user endpoint device is authenticated, analyzing content of a data packet transmitted through the tunnel to determine if the tunnel should be re-directed, and re-directing the tunnel to a gateway general packet radio services support node light based upon the content of the data packet.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
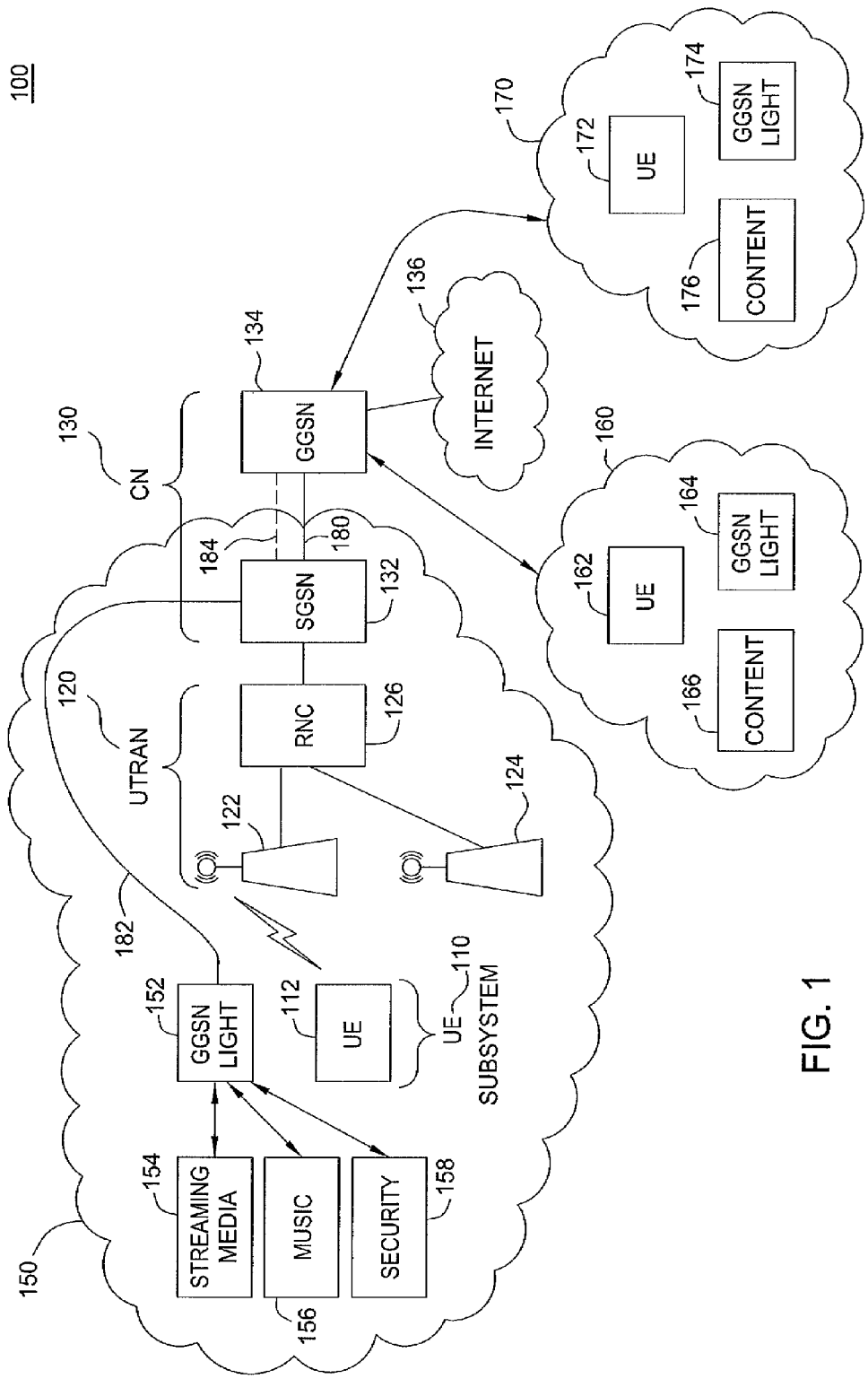
FIG. 1 illustrates one example of a cellular communications network architecture.

The present disclosure broadly discloses a method, computer readable medium and an apparatus for performing content aware optimized tunneling in a communication network. FIG. 1 is a block diagram depicting one example of a cellular communications network architecture 100 related to the current disclosure. In one embodiment, the cellular communications network architecture comprises a 3G cellular network such as a universal mobile telecommunications system (UMTS) network and the like. However, it should be noted that the cellular communications network architecture 100 may include other types of cellular communications networks such as general packet radio services (GPRS) networks, global system for mobile communication (GSM) networks or enhanced data rates for GSM evolution (EDGE) networks, and the like, by substituting the appropriate hardware and/or hardware configurations for the respective networks.

FIG. 1 is a block diagram depicting an exemplary cellular communications network architecture 100 related to the current disclosure. In one embodiment, the network architecture 100 includes three subsystems comprising a user equipment (UE) subsystem 110, a UMTS terrestrial radio access network (UTRAN) subsystem 120 and a core network (CN) 130.

In one embodiment, the UE subsystem 110 includes one or more user endpoint (UE) devices 112. The user endpoint devices 112 may include a mobile telephone, a smart phone, a messaging device, a tablet computer, a laptop computer, an air card and the like. The user endpoint devices 112 may communicate wirelessly with elements of the cellular communications network architecture 100.

In one embodiment, the UTRAN subsystem 120 includes one or more base stations 122 and 124 and a radio network controller (RNC) 126. In one embodiment, the base stations 122 and 124 may be an eNodeB. The UTRAN subsystem 120 provides connectivity between the user endpoint devices 112 and the core network 130. The UTRAN subsystem 120 provides features such as packet scheduling, radio resource control (RRC) and handover control via the RNC 126.

In one embodiment, the core network 130 includes a serving GPRS support node (SGSN) 132, and a gateway GPRS support node (GGSN) 134 for interacting with the internet 136. The GGSN 134 serves as a gateway hiding UMTS internal infrastructures from an external network.

The core network 130 is the backbone of the cellular communications network architecture 100. It should be noted that although various numbers of hardware equipment or network elements are illustrated, the actual numbers of illustrated elements should not be interpreted as a limitation of the present disclosure. For example, although two base stations 122 and 124 are illustrated, the network architecture 100 may include any number of base stations. In fact, various additional network elements may actually exist but are not illustrated in FIG. 1.

Generally, when the user endpoint device 112 sends a wireless communication, the wireless communication must travel through the GGSN 134 that may potentially be located thousands of miles away from the user endpoint device 112. However, the user endpoint device 112 may be situated within a location 150 and the content that the user endpoint device 112 is trying to access may be located in a server 154 (e.g., a streaming media server), a server 156 (e.g., a music server) or a server 158 (e.g., a security server) that is located near the user endpoint device. As a result, using current wireless communication protocols, the wireless communication would travel thousands of miles away through the GGSN 134 and then travel thousands of miles back to access the content on one of the servers 154, 156 or 158 that is actually located near the user endpoint device 112.

Due to the complexity and costs associated with the GGSN 134, only a limited number of GGSNs 134 is deployed across the country. To resolve this problem, a GGSN light 152 can be deployed closer to the user endpoint device 112. For example, the GGSN light 152 may be located near (broadly geographically close to) the user endpoint device 112, the base station 122 or 124, the RNC 126 or the SGSN 132, all of which are typically located near the user endpoint device 112.

In one embodiment, a GGSN light 152 (broadly a reduced function GGSN) may perform only a subset of the functions of the GGSN 134 to reduce complexity and cost, thereby allowing the GGSN light 152 to be deployed easily across many locations. For example, the GGSN light 152 may perform functions such as supporting communications with an SGSN 132 and the GGSN 134 and supporting protocols to transfer tunnels from the GGSN 134 to the GGSN light 152. The GGSN light 152 may exclude traditional functions of the GGSN 134 such as, for example, an authentication function, a firewall function and an internet protocol assignment function.

In this manner, many GGSN lights may be deployed across the country. For example, a GGSN light 164 may be deployed near a user endpoint (UE) device 162 and a content server 166 at a location 160. Another GGSN light 174 may be deployed near a user endpoint (UE) device 172 and a content server 176 at a location 170. The locations 150, 160 and 170 are all different from one another and are geographically located far away from one another and the GGSN 134. Although only three GGSN lights 152, 164 and 174 at three different locations 150, 160 and 170 are illustrated, it should be noted that any number of GGSN lights may be deployed at any number of different locations.

Each one of the locations 160 and 170 may communicate with the GGSN 134 using their own respective base station, RNC and SGSN (not shown) similar to the base station 122, 124, the RNC 126 and the SGSN 132 at location 150. One embodiment of the present disclosure is discussed with respect to location 150 for simplicity, but it should be noted that the examples discussed herein may be equally applicable to other locations such as locations 160 and 170 as well.

Referring back to FIG. 1, the GGSN 134 initially establishes a tunnel 180 to communicate with the user endpoint device 112 after the user endpoint device 112 is authenticated by the GGSN 134. Then, based upon the content of a data packet in the tunnel 180, the GGSN 134 may re-direct or hand off the tunnel 180 to the GGSN light 152 as illustrated by line 182.

In one embodiment, the content of the data packet may be analyzed via a traffic analyzer application programming interface (API). The traffic analyzer may be configured as a separate module that is located before the GGSN 134 or as part of the GGSN 134. In one embodiment, the data packet may be analyzed by looking at a packet data protocol (PDP)-context. For example, based upon the PDP-context the type of content requested in the data packet may be determined. For example, the PDP-context may be modified to include fields that identify the type of content that is in the data packet.

In another embodiment, the data packet may be analyzed by removing a header packet and then looking at a body of the data packet to determine the content. In one embodiment, both methods of analyzing the data packet may be deployed.

Thus, the wireless communication from the user endpoint device 112 does not need to travel thousands of miles away to access content that is actually located near the user endpoint device 112. For example, if the request is for a video content (e.g., a YouTube® video, where YouTube® is a trademark of Google, Inc.), the user endpoint device 112 may access the streaming media server 154 via the tunnel 182 and the GGSN light 152. If the request is for a music file (e.g., an Itunes® file, where Itunes® is a trademark of Apple Computer, Inc.), the user endpoint device 112 may access the music server 156 via the tunnel 182 and the GGSN light 152. In addition, some of the processing load of the GGSN 134 may be offloaded to the GGSN light 152.

In one embodiment, the GGSN light 152 may also offload some security features from the GGSN 134. For example, if the GGSN 134 determines that the data packet is a suspicious data packet, the GGSN 134 may re-direct the tunnel 180 to the GGSN light 152 for further processing. The GGSN light 152 may determine whether the suspicious packet should be filtered, blocked or remain unchanged. Based upon the analysis performed by the GGSN light 152, the GGSN light 152 may further send the suspicious packet to a security server 158, e.g., a black hole server, if the suspicious packet is determined to be a security threat.

In one embodiment, the GGSN 134 may need to maintain communications with both the user endpoint device 112 and the GGSN light 152. As a result, a second tunnel 184 may be optionally established. In other words, one tunnel may be may be re-directed, e.g., the tunnel 180, if necessary, as shown by line 182, while maintaining the second tunnel 184.

As a result, re-directing the tunnel optimizes the tunnel for the network architecture 100. In one embodiment, optimizing can be defined as establishing a tunnel to a server the user endpoint device is trying to access via a GGSN light that is closest to the user endpoint device.

The GGSN lights may be deployed in accordance with various strategies to optimize the tunnels. For example, the GGSN light may store copies of popular content such that each user endpoint device may have access to content closest to them via the GGSN light. In another example, the GGSN light may store unpopular content (e.g., tail ends of a distribution) while the most popular content is accessed via the GGSN. The strategies described above are only examples and other strategies for deploying the GGSN light are possible, which are within the scope of the present disclosure.

The cellular communications network architecture 100 may also include additional hardware or network components that are not illustrated. In other words, FIG. 1 only illustrates a simplified cellular communications network architecture 100 and should not be interpreted as a limitation of the present disclosure.

Figure 2:
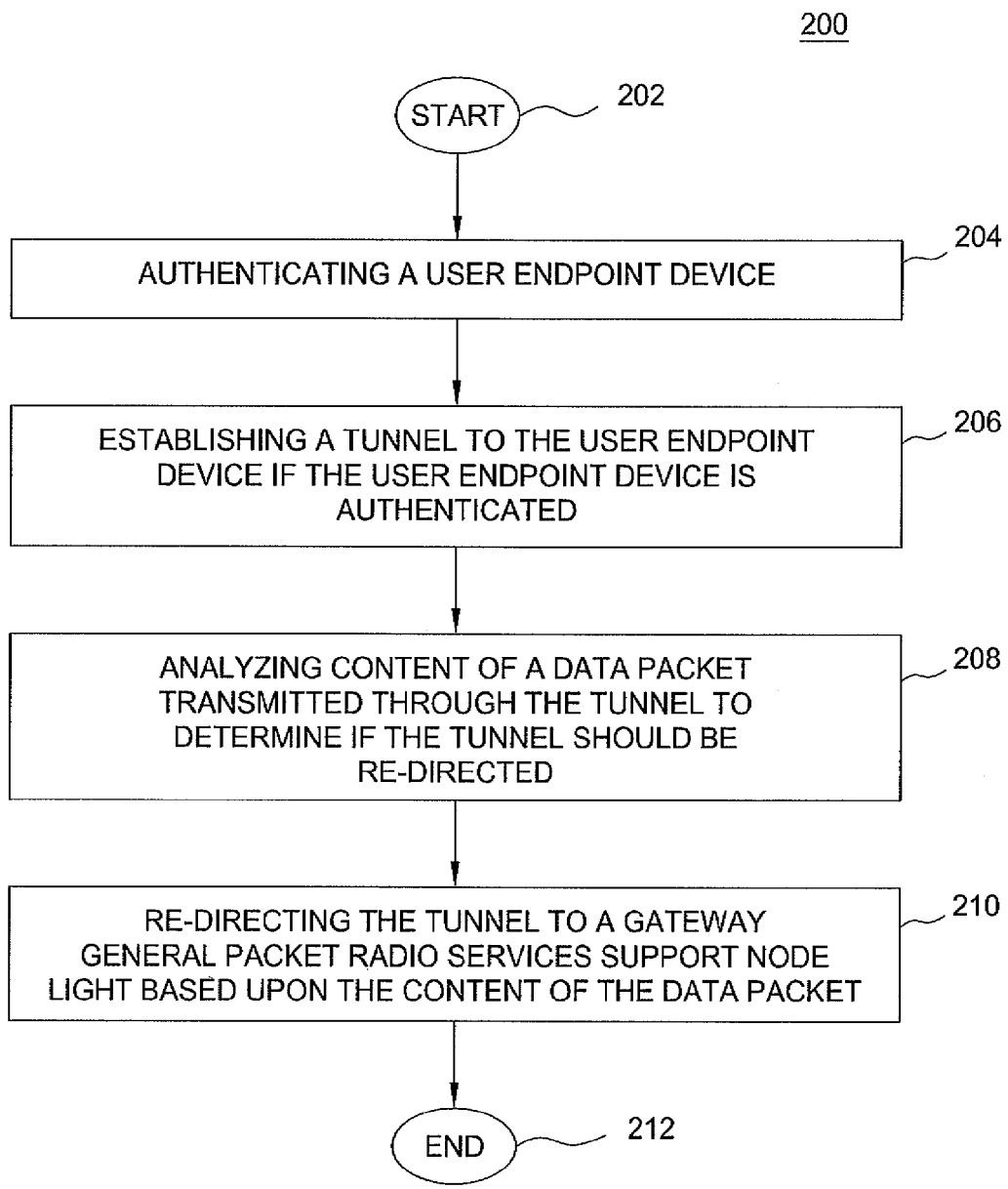
FIG. 2 illustrates a high level flowchart of a method for performing content aware optimized tunneling in a communication network.

FIG. 2 illustrates a high level flowchart of a method 200 for performing content aware optimized tunneling in a communication network. In one embodiment, the method 200 may be implemented by the GGSN 134 or a general purpose computer having a processor, a memory and input/output devices as discussed below with reference to FIG. 4.

The method 200 begins at step 202 and proceeds to step 204. At step 204, the method authenticates a user endpoint device. For example, any standard authentication protocols may be used.

At step 206, the method 200 establishes a tunnel to the user endpoint device if the user endpoint device is authenticated. For example, a GTP tunnel is established between the user endpoint device and the GGSN. Once the tunnel is established, data packets may be transmitted via the tunnel.

At step 208, the method 200 analyzes content of a data packet transmitted through the tunnel to determine if the tunnel should be re-directed. For example, a traffic analyzer may be used to determine what type of content is being requested or what type of content is in the data packet. Based on the content type, it may be possible to optimize the tunnel by re-directing or handing off the tunnel.

At step 210, the method 200 re-directs the tunnel to a GGSN light based upon the content of the data packet. As noted above, if it is possible to optimize the tunnel by re-directing the tunnel based upon the content of the data packet, the tunnel is re-directed to the GGSN light. In one embodiment, optimization may be defined as establishing a tunnel to a server the user endpoint device is trying to access via a GGSN light that is closest to the user endpoint device. The method 200 ends at step 212.

Figure 3:
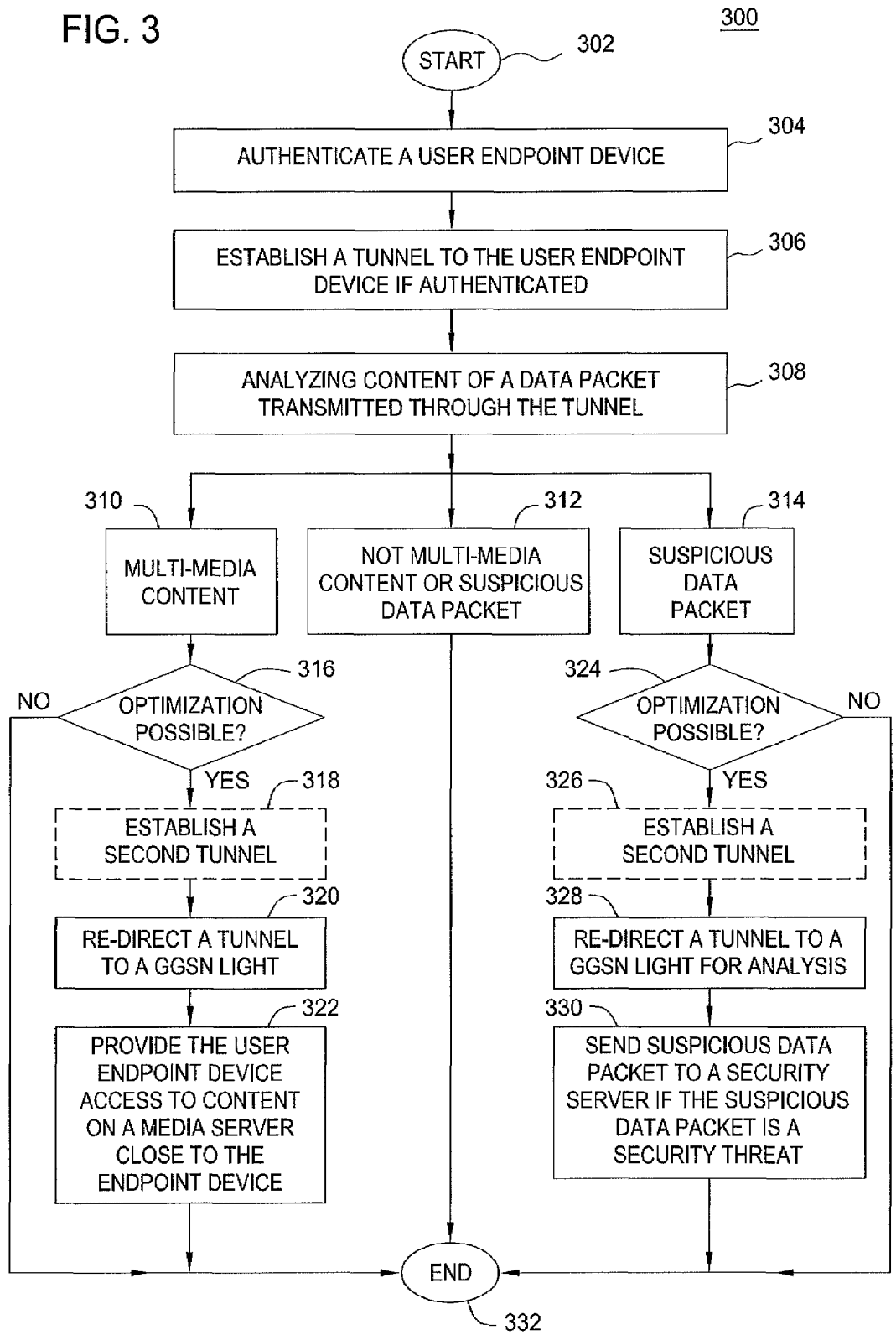
FIG. 3 illustrates a more detailed flowchart of a method for performing content aware optimized tunneling in a communication network.

FIG. 3 illustrates a detailed flowchart of a method 300 for performing content aware optimized tunneling in a communication network. In one embodiment, the method 300 may be implemented by the GGSN 134 or a general purpose computer having a processor, a memory and input/output devices as discussed below with reference to FIG. 4.

The method 300 begins at step 302 and proceeds to step 304. At step 304, the method 300 authenticates a user endpoint device. For example, any standard authentication protocols may be used. At step 306, the method establishes a tunnel to the user endpoint device if the user endpoint device is authenticated.

At step 308, the method 300 analyzes content of a data packet transmitted through the tunnel. For example, a traffic analyzer application programming interface may be used to analyze the data packet. In one embodiment, the traffic analyzer may be a separate module placed before the GGSN or a part of, the GGSN.

In one embodiment, the data packet may be analyzed by looking at a PDP context. For example, based upon the PDP-context the type of content requested in the data packet may be determined. The PDP-context may be modified to include fields that identify the type of content that is in the data packet.

In another embodiment, the data packet may be analyzed by removing a header packet and then looking at a body of the data packet to determine the content. In one embodiment, both methods of analyzing the data packet can be deployed.

In one embodiment, if the content of the data packet is multi-media content, the method proceeds to step 310. Multi-media content may include streaming video (e.g., YouTube® videos), music files (e.g., Itunes®), pictures and the like. If the content of the data packet is a suspicious data packet, the method 300 proceeds to step 314. If the data packet is neither multi-media content nor a suspicious packet, the method 300 proceeds to step 312 and then to step 332, where the method 300 ends.

Referring back to step 310, after step 310, the method 300 proceeds to step 316 where the method 300 determines if optimization is possible. Some multi-media packets may not be optimized for various reasons. For example, the user endpoint device may already be near a GGSN and thus redirecting the tunnel to another GGSN light may not be necessary. Alternatively, the content may not be accessible using any GGSN lights and, therefore, the wireless communication may still need to go through the GGSN. These are only a few examples and are not intended to be limiting to the present disclosure.

If optimization is not possible, the method 300 proceeds to step 332 and ends. If optimization is possible, the method 300 may proceed to optional step 318 where a second tunnel is established. As discussed above, in some instances the GGSN may need to maintain communications with the GGSN light and/or the user endpoint device.

At step 320, the method 300 re-directs a tunnel to a GGSN light. It should be noted that if optional step 318 was performed, one of the two tunnels would be re-directed to the GGSN light, while maintaining the other tunnel with the GGSN.

As discussed above, the GGSN light may perform a subset of the functions of the GGSN 134 to reduce complexity and cost, thereby allowing the GGSN light 152 to be deployed easily across many locations. For example, the GGSN light 152 may perform all of the functions of the GGSN 134 except an authentication function, a firewall function and an internet protocol assignment function.

At step 322, the method 300 provides the user endpoint device access to content on a media server close to the user endpoint device via the re-directed tunnel and the GGSN light. The method 300 ends at step 332.

Referring back to step 314, if the data packet is a suspicious data packet, the method 300 proceeds to step 324. At step 324, the method 300 determines if optimization is possible. For example, the GGSN may find that analyzing the packet may be more efficiently performed by a GGSN light to offload some processing from the GGSN.

If optimization is not possible, the method 300 proceeds to step 332 and ends. However, if optimization is possible, the method 300 may proceed to optional step 326 where a second tunnel is established. As discussed above, in some instances the GGSN may need to maintain communications with the GGSN light and/or the user endpoint device.

At step 328, the method 300 re-directs a tunnel to a GGSN light for analysis. It should be noted that if optional step 326 was performed, one of the two tunnels would be re-directed to the GGSN light, while maintaining the other tunnel with the GGSN. The GGSN light may determine if the suspicious data packet should be filtered, blocked or unchanged. For example if the suspicious data packet poses a security threat, the suspicious data packet may be filtered or blocked.

At step 330, the method 300 sends the suspicious data packet to a security server if the suspicious data packet is a security threat. For example, the suspicious data packet may be sent to a black hole server via the GGSN light. The method 300 proceeds to step 332 and ends.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

Figure 4:
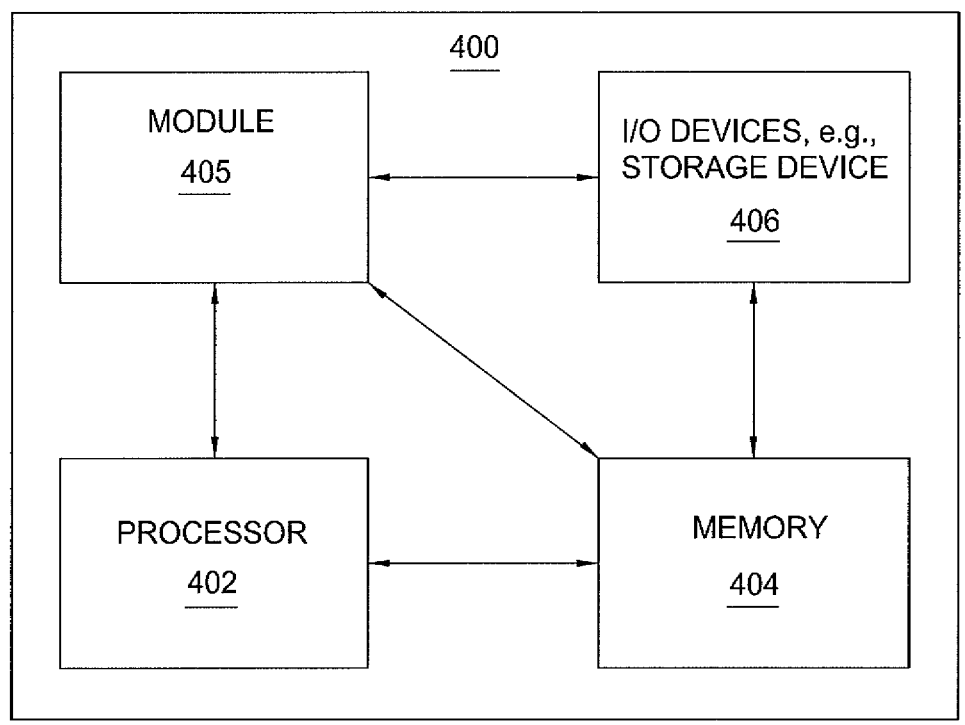
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for performing content aware optimized tunneling in a communication network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for performing content aware optimized tunneling in a communication network can be loaded into memory 404 and executed by processor 402 to implement the functions as discussed above. As such, the present method 405 for performing content aware optimized tunneling in a communication network (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing content aware optimized tunneling in a communication network, comprising:
- authenticating, by a processor, a user endpoint device;
- establishing, by the processor, a tunnel to the user endpoint device if the user endpoint device is authenticated;
- analyzing, by the processor, content of a data packet transmitted through the tunnel to determine if the tunnel should be re-directed; and
- re-directing, by the processor, the tunnel to a gateway general packet radio services support node light based upon the content of the data packet, wherein the gateway general packet radio services support node light does not perform an authentication function, a firewall function and an internet protocol assignment function.

2. The method of claim 1, wherein the analyzing is performed via a traffic analyzer application programming interface.

3. The method of claim 1, wherein the analyzing comprises:
- looking at a packet data protocol context.

4. The method of claim 1, wherein the analyzing comprises:
- removing a packet header; and
- looking at a body of the data packet to determine the content.

5. The method of claim 1, wherein the content comprises a request for multi-media content.

6. The method of claim 5, wherein the user endpoint device accesses a multi-media server that is geographically close to the user endpoint device via the tunnel that is re-directed to the gateway general packet radio services support node light.

7. The method of claim 1, wherein the content indicates that the data packet is a suspicious packet that is determined to pose a security threat.

8. The method of claim 7, wherein the suspicious packet is sent to a security server that is geographically close to the user endpoint device via the tunnel that is re-directed to the gateway general packet radio services support node light.

9. The method of claim 1, wherein the re-directing comprises selecting the gateway general packet radio services support node light for optimizing an access to the content.

10. The method of claim 9, wherein the optimizing the access comprises re-directing the tunnel to the gateway general packet radio services support node light when the gateway general packet radio services support node light is a geographically closest gateway general packet radio services support node light to the user endpoint device.

11. The method of claim 1, further comprising:
- establishing a second tunnel to the user endpoint device.

12. A computer-readable medium that is not a signal, the computer-readable medium storing instructions which, when executed by a processor, cause the processor to perform operations for performing content aware optimized tunneling in a communication network, the operations comprising:
- authenticating a user endpoint device;
- establishing a tunnel to the user endpoint device if the user endpoint device is authenticated;
- analyzing content of a data packet transmitted through the tunnel to determine if the tunnel should be re-directed; and
- re-directing the tunnel to a gateway general packet radio services support node light based upon the content of the data packet, wherein the gateway general packet radio services support node light does not perform an authentication function, a firewall function and an internet protocol assignment function.

13. The computer-readable medium of claim 12, wherein the analyzing is performed via a traffic analyzer application programming interface.

14. The computer-readable medium of claim 12, wherein the analyzing comprises:
- looking at a packet data protocol context.

15. The computer-readable medium of claim 12, wherein the analyzing comprises:
- removing a packet header; and
- looking at a body of the data packet to determine the content.

16. The computer-readable medium of claim 12, wherein the re-directing comprises selecting the gateway general packet radio services support node light for optimizing an access to the content.

17. The computer-readable medium of claim 16, wherein the optimizing the access comprises re-directing the tunnel to the gateway general packet radio services support node light when the gateway general packet radio services support node light is a geographically closest gateway general packet radio services support node light to the user endpoint device.

18. The computer-readable medium of claim 12, further comprising:
- establishing a second tunnel to the user endpoint device.

19. An apparatus for performing content aware optimized tunneling in a communication network, comprising:
- a processor; and
- a computer-readable medium storing instructions which, when executed by the processor, cause the processor to perform operations, the operations comprising:
  - authenticating a user endpoint device;
  - establishing a tunnel to the user endpoint device if the user endpoint device is authenticated;
  - analyzing content of a data packet transmitted through the tunnel to determine if the tunnel should be re-directed; and
  - re-directing the tunnel to a gateway general packet radio services support node light based upon the content of the data packet, wherein the gateway general packet radio services support node light does not perform an authentication function, a firewall function and an internet protocol assignment function.

* * * * *